Jan. 12, 1954 E. J. B. MILLER 2,665,503

COLOR HARMONY SELECTION SYSTEM

Filed July 5, 1951

3 Sheets-Sheet 1

Inventor
Edith Jean Blanc Miller
by Hill, Sherman, Meroni, Gross & Simpson Attys

COLOR HARMONY SELECTION SYSTEM

Filed July 5, 1951

3 Sheets-Sheet 2

Inventor
Edith Jean Blanc Miller
By Hill, Sherman, Meroni, Gross & Simpson Attys Inventor
Edith Jean Blanc Miller
by Hill, Sherman, Meroni, Gross & Simpson Attys Patented Jan. 12, 1954

2,665,503

UNITED STATES PATENT OFFICE 2,665,503

COLOR HARMONY SELECTION SYSTEM

Edith Jean Blanc Miller, Chicago, Ill., assignor to Desarco Corporation, Chicago, Ill., a corporation of Illinois Application July 5, 1951, Serial No. 235,327

9 Claims. (Cl. 35—28.3)

The present invention relates to a color harmony selection system by means of which a user can rapidly and conveniently select harmonious color combinations from an extremely wide variety of selections.

Previously used color harmony selection systems have not always met with approval by decorators and other artists interested in the problem of color design. In some of the systems previously employed, the number of possible color combinations derivable from the system has been rather limited. In other systems which permit a wider selection of color combinations from which to choose appropriate color harmonies, the systems employed are sometimes unwieldy and require the services of an expert trained in color theory for operation. Such systems are, of course, impractical commercially because they are beyond the prowess of the ordinary layman who might be interested in selecting a harmonious color arrangement for rooms in his own home.

The present invention provides a color harmony selection system which overcomes the disadvantages associated with the previous color harmony selections. The system of my invention is capable of presenting different color combinations which number in the millions. Yet at the same time the system is sufficiently flexible and sufficiently uncomplicated that it can be employed to advantage by those unskilled in color selection, or the theory of colors.

An object of the present invention is to provide a color harmony selection system which permits the selection of harmonious color combinations among a very wide variety of choices.

Another object of the present invention is to provide a color harmony selection system which can be manipulated and used effectively by persons relatively unskilled in the theory and practice of decorating.

Still another object of the present invention is to provide a color harmony selection system consisting of only a few basic components.

Another object of the present invention is to provide a novel type of color array for use in color harmony selection systems.

A further description of the present invention will be made in connection with the attached sheets of drawings in which.

Figure 11:
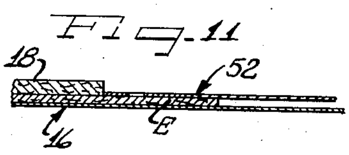
Figure 2:
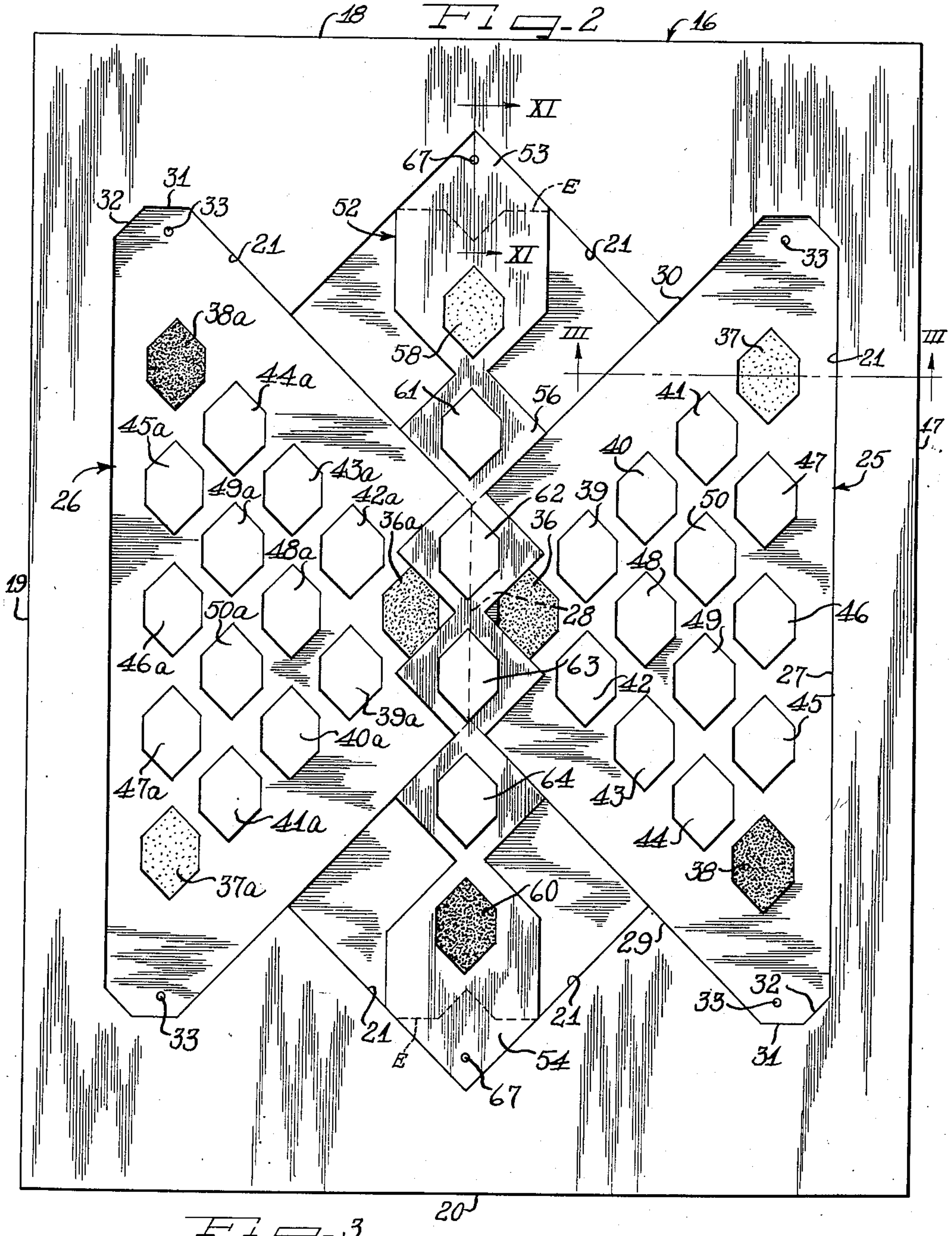
Figure 2 is a plan view of the color selection system, including the mounting board, the color arrays and neutral scale disposed thereon.
Figure 3:
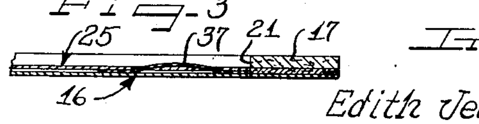
Figure 3 is a fragmentary cross-sectional view taken substantially along line III—III of Figure 2.
Figure 10:
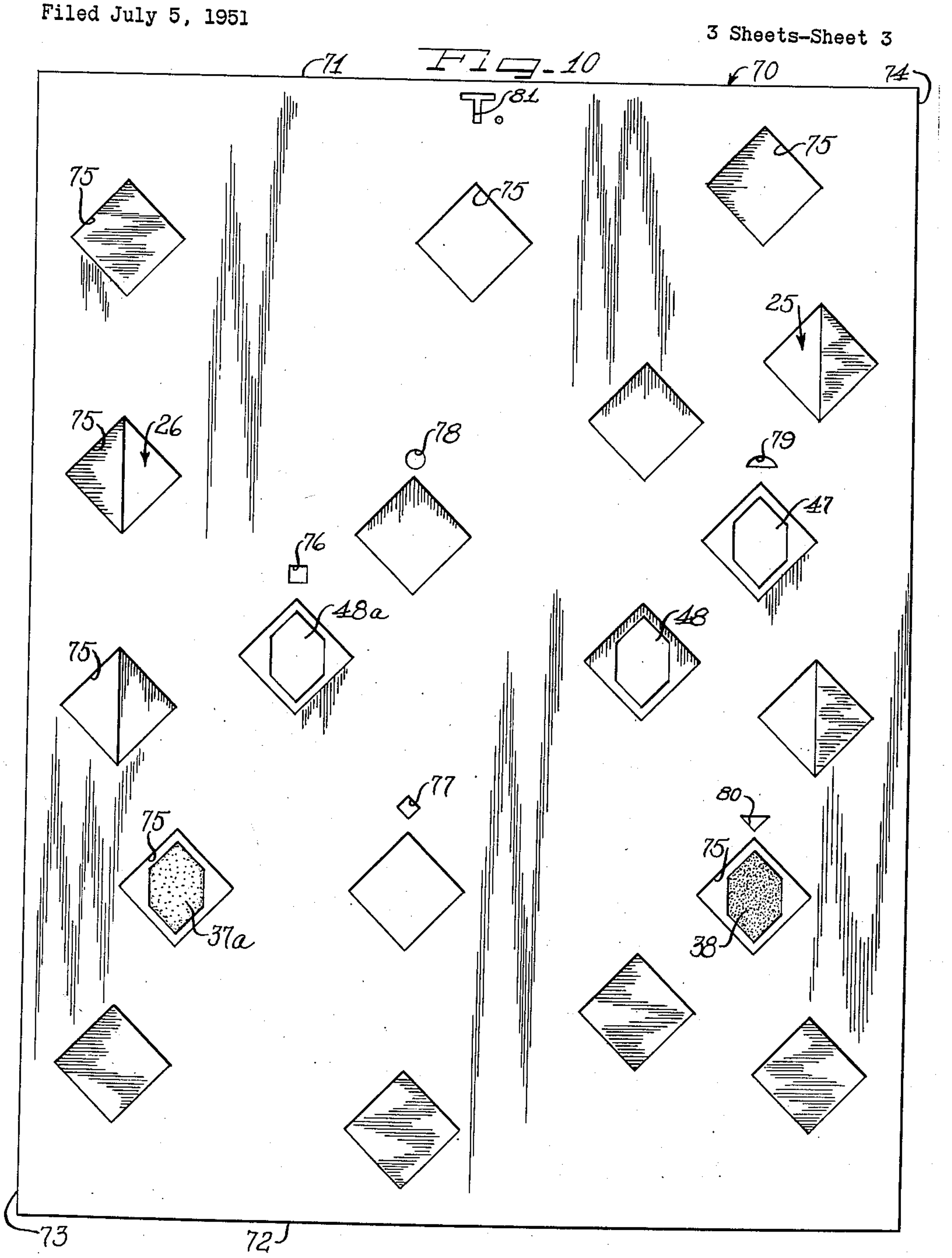

Figures 4 to 9, inclusive, are diagrammatic views illustrating how the color arrays shown in Figure 2 can be arranged in six basic positions within the mounting board structure;

Figure 10 is a plan view of the structure shown in Figure 2 and including the apertured mask with the windows therein for selecting color combinations from the underlying arrays and neutral scale; and Figure 11 is a fragmentary cross-sectional view taken along the line XI—XI of Figure 2.

The first step in any color harmony selection system is the selection of two or more basic colors which will dominate the proposed color scheme. To aid in such a selection, the device illustrated in Figure 1 may be conveniently employed.

Figure 1:
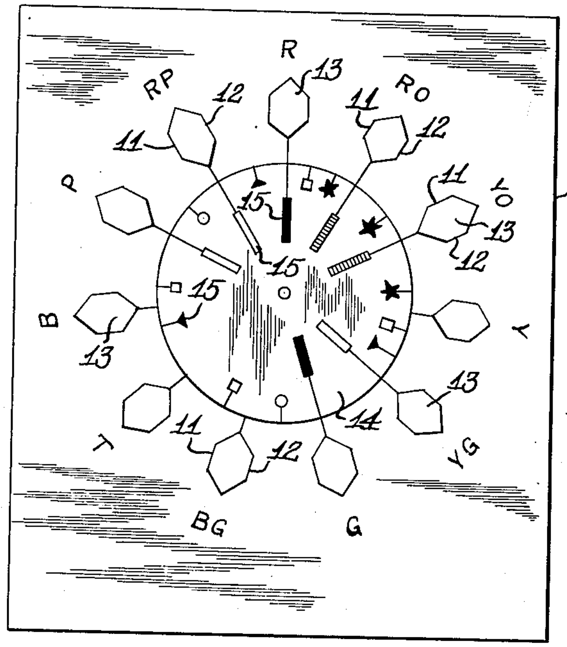
Figure 1 is a plan view of a color wheel which can be employed in conjunction with the color harmony selection system of the present invention.

The color wheel of Figure 1 includes a generally rectangular base 10 which may conveniently be composed of material such as flexible cardboard or the like. The base 10 is suitably slotted as along lines 11 and 12 to receive a plurality of color indicia such as color particles 13. Each of the color particles 13 may be substantially square, each particle being locked in position on the base 10 by inserting diagonally opposite corners of the square particles 13 through the slots 11 and 12 so that the ultimate shape of the particle 13, as viewed on the surface of the base 10, is generally hexagonal. The color particles 13 are disposed radially about the center of the base 10 in a predetermined arrangement. Each of the particles 13 is colored with a standard "pure color," the particular characteristics of any pure color being well known in the art of color design.

In the color wheel of Figure 1, I have illustrated eleven such color particles 13 disposed around the center of the base 10. Each of the color particles of Figure 1 is labeled with a symbol denoting its color. Thus, R stands for red, RO represents red-orange, YO represents yellow-orange, Y represents yellow, YG represents yellow-green, G represents green, BG represents blue-green, T represents turquoise, B represents blue, P represents purple, and RP represents red-purple.

Disposed at the center of the base 10 is a rotatable color selecting wheel 14. The wheel 14 has printed on it a plurality of indexing marks 15 along the periphery thereof. In using the color wheel, one of the indexing marks 15 is placed in alignment with a selected color particle 13 which is to form one of the colors in the basic color harmony system desired. For example, in the position of the wheel 14 illustrated in Figure 1, the indexing mark represented by the solid rectangular bar has been placed in registry with the color particle 13 of pure red. The solid rectangular bar indexing marks on the color wheel are arranged to select two colors which form a near complement with each other. Thus, in the position of the wheel illustrated in Figure 1, the position of the color wheel 14 indicates that green forms a near complement with red. By turning the rotatable wheel again, the solid bar will select blue-green as the near complement of red.

In a similar manner other types of basic color harmonies can be selected through the use of other indexing marks on the wheel 14. For example, the indexing marks represented by the stars are arranged to select three consecutive colors. Thus, if the star which is farthest in a counter-clockwise direction is aligned with the color particle of red, the other two stars will point to red-orange and yellow-orange, respectively. This type of combination is referred to as an analogous harmony.

Another three-component system can be selected by using the triangular indexing marks illustrated. For example, if one of the triangular marks is in registry with the red particle 13, the three resulting color combinations, representing a color triad, will be red, yellow-green, and blue; red, yellow, and turquoise; and red, yellow-green and torquoise.

In a similar way, by using the indexing marks in the form of a square, a four-color system will be selected. This type of harmony, based upon four colors which are almost equally spaced, is sometimes called a tetrad.

Similarly, the indexing marks represented by the unshaded rectangles can be used to select a three-component system which corresponds to a split complement color harmony. The two indexing marks, represented by circles, are suitably spaced to enable selection of a four to seven step color scheme.

Once the basic components of the proposed color harmony scheme have been selected, through the use of the color wheel of Figure 1, or some other basic harmony selection system, the selection of individual harmonies is carried out by the means of the assembly illustrated in Figures 2–10 of the drawings.

As illustrated in Figure 2, the selection system of the present invention includes a laminated flat locking board 16 which may be suitably composed of a relatively stiff material such as heavy cardboard and the like. The interior of the mounting board 16 is recessed, as indicated generally by the numeral 21, leaving the upstanding marginal edges 17, 18, 19 and 20 about the recessed interior of the mounting board 16. The locking board 16 also has a pair of raised extensions at opposite ends thereof, these extensions being indicated by the letter E on the drawings. The extensions E are raised from the base of the recessed locking board 16 but are below the level of the top surface of the locking board, as shown in Figure 11. As will be hereinafter explained, the extensions E, together with the angular sides defining the recessed portion of the locking board, coact to hold selected color arrays within the recessed locking board in a variety of fixed predetermined positions.

One of the significant features of the present invention resides in the type of color array used in conjunction with the color harmony selection system. One color array is provided for each of the basic colors, such as the eleven colors illustrated in the color wheel of Figure 1. Two such color arrays are shown in Figure 2 in fixed position within the recessed locking board 16. Generally, each of the color arrays, indicated at numerals 25 and 26, consists of a polygonal-shaped member, preferably of a white material, having a plurality of color particles detachably secured thereto.

In the embodiment of the invention illustrated in Figure 2, the color array 25 is in the general form of a trapezoid, having a relatively long base edge 27, a relatively short edge 28 parallel to the base edge 27, and angularly disposed sides 29 and 30 joining the two parallel edges 27 and 28 of the trapezoidal color array 25. For conveniently mounting the color array 25 in the recessed locking board 16, the edges of the color array 25 may be trimmed as indicated at 31 and 32 for better engagement with the corresponding edges of the recessed interior of the locking board 16. When the color array is placed in the locking board with the base edge 27 at the center line of the board, the edges 31 and 32 will engage the angular extensions E and lock the array in position. To facilitate removal of the color array 25 from its locked position within the locking board 16, a plurality of small apertures 33 is provided, so that upon insertion of a pointed element, the array 25 can be conveniently lifted from the locking board 16.

Each color array, of which the array 25 is a typical example, carries a plurality of color indicia representing shades and tints of a single pure color, no two color indicia having the exact shade of the selected color. For example, assuming that the color array 25 is used for the color red, various shades of red will be represented by means of individual color particles disposed in aligned rows along the surface of the array 25.

The arrangement of the various shades of a given color in each color array forms an important aspect of the present invention. In the arrangement shown in Figure 2, the color array 25 contains a plurality of color particles in rows and arranged in the form of a right-angle triangle. At the vertex of the triangle nearest the shortest marginal edge 28 of the color array 25 is a color particle 36 having a pure red color, in the illustrated example.

The color particles are detachably secured onto the surface of the trapezoidal array 25 by providing slots in the color array 25 and inserting diagonally opposite edges of individual color particles of different shades of the same color through the slots. The means by which the color particles are secured within the color array 25 is best illustrated in the fragmentary cross-sectional view of Figure 3.

At one of the other vertices of the triangle formed by the color particle is a color prticle hving a light tint of red. In the third vertex of the triangle the color particle 38 (having a relatively dark shade of red) is provided. To facilitate proper use of the system, the position of each color particle is preferably identified by a number system printed on the color array next to each of the color particles. Such a numbering system should identify any given position by the number of the row and the number of that position in that row.

For purposes of clarity, only the color particles of the color array 25 which are located at the vertices of the triangle have been shaded in the drawing. The lightest stippling is used to denote the lightest tint of the color to be employed, while the heaviest stippling (appearing in the color particle 38) is used to denote the darkest shade of the given color.

The strength of the colors in the remaining color particles of the color array 25 varies between the strength of the colors represented at the vertices of the triangle. Thus, the color particles 39, 40 and 41, located between the pure color particle 36 and the light tint particle 37, are progressively lighter with respect to the predominating color. In the same way, color particles 42, 43 and 44, which are arranged in a row between the pure color particle 36 and the dark shade particle 38, are progressively darker with respect to the pure color embodied in the particle 36. Similarly, the color particles 45, 46 and 47, disposed in a row between the darkest shade particle 38 and the lightest tint particle 37 of the selected color, have proportionately more white and less black.

In keeping with the general scheme, a color particle 48, appearing in the same row between the color particles 40 and 43, provides a color of an intermediate value between the two hues represented by the color particles 40 and 43. In a similar manner, color particles 49 and 50 are particles whose values are intermediate between those represented by the color particles 41 and 44 in the same row.

Thus, from the combination illustrated in the showing of Figure 2, fifteen individual variations of the same color, varying in strength from a very light tint represented by the color particle 37 to the pure color represented by the color particle 36 to the dark shade represented by the color particle 38, are represented in a given color array 25.

The geometric arrangement of each of the color arrays is identical, so that the color array 26 is the same as the color array 25 except that it contains variations of a different predominating color hue. Assuming that the color array 25 represents the variations of red, the array 26 may represent a system of green color with the pure green color denoted by a color particle 36*a*, the darkest shade of green by a color particle 38*a*, and the lightest tint of green by a color particle 37*a*. It will be understood that the color particles intermediate the extremes represented at the vertices of the triangle vary progressively between the vertices, as explained in conjunction with the color array 25. The color particles of the array 26, which correspond in position to the color particles of the array 25, have been identified on the drawings with the same reference numeral, but with a subscript "*a*."

Two selected color arrays, such as arrays 25 and 26, are locked in position within the recess of the locking board 16 with two of the edges thereof in abutting contact, as shown in Figure 2.

In addition to the color arrays 25 and 26, the color harmony selection system of the present invention may also be provided with an additional neutral scale indicated generally at numeral 52. This neutral scale 52 consists of a continuous strip of material, such as cardboard, paperboard and the like, and has opposed edge portions 53 and 54 arranged to be received in locked position within the recess 21 of the locking board 16 over the extensions E (Figure 11). The neutral scale 52 is cut so as to provide a plurality of diamond-shaped protuberances 56 intermediate the ends thereof. It will be observed that as the neutral scale 52 is placed in position within the recessed locking board 16, the shape of the cut-away portion is such as to permit the pure color particles 36 and 36*a* to be fully visible when the neutral scale 52 is placed over the abutting edges of the color arrays 25 and 26.

Arranged in a single row along the neutral scale 52 are a plurality of particles varying from a white particle 58 to a black particle 60. Intermediate these two particles are a vertical row of grey particles, beginning with a light grey particle 61, a slightly darker grey particle 62, a moderately grey particle 63, and a dark grey particles 64. A pair of small apertures 67 at opposite ends of the neutral scale 52 are provided to facilitate removal of the neutral scale from its locked position within the locking board 16. In use, the neutral scale may be located with its white particle uppermost, or with the black particle uppermost.

Any two color arrays can be placed in six different basic positions with respect to each other on the locking board, or six secondary positions as will be hereinafter explained. The six basic positions have been illustrated in Figures 4 through 9. For purposes of clarity, only the color particles which form the vertices of the color particle triangle have been illustrated in these figures. Each of the figures illustrates the position of two color arrays 25 and 26 in various geometrical relation. In the position shown in Figure 4, the color arrays 25 and 26 are so arranged that the color particles 37 and 37*a*, representing the lightest tints of the two selected colors, are located in the upper right-hand portion of the respective arrays, while the darkest shades of the respective colors, represented by color particles 38 and 38*a*, are disposed in the lower right-hand corner of the respective color arrays. In this arrangement, the shortest side of the trapezoidal color array 26 is in abutting contact with the base, or longest edge of the other color array 25.

Figure 4:
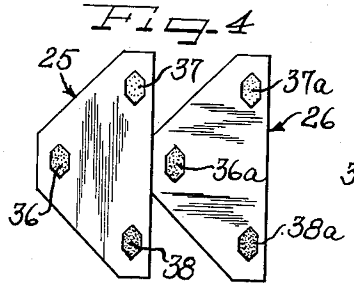
Figure 5:
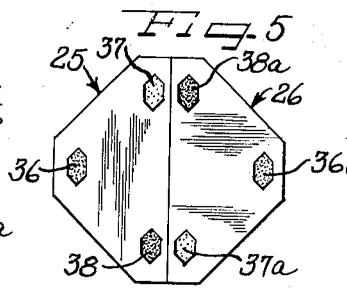

In the arrangement of the color arrays shown in Figure 5, the relative position of the color array 25 and the color particles thereon is the same as it appears in Figure 4, but the color array 26 has been turned without re-arrangement of the color particles so that the base of the array 26 is in abutting contact with the base of the array 25. In this arrangement, the light tint particle 37 of the array 25 is directly opposite the dark shade particle 38*a* of the array 26, and the darkest shade particle 38 of array 25 is directly opposite the lightest tint particle 37*a* of array 26.

Figure 6:
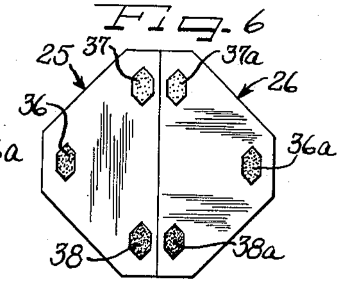

In the arrangement of Figure 6, the array 25 is in the same relative position as it appears in Figures 4 and 5. However, in this embodiment, the particles on the array 26 have been re-arranged. This re-arrangement is accomplished by realigning all the color particles, with the exception of the pure color particle 36*a*, so that the dark shade particle 38*a* and the light tint particle 37*a* (and all of the color particles intermediate these particles) are in positions forming a mirror image of their previous positions.

In this arrangement, the color particle 37*a* appears in position opposite the color particle 37, and the dark shade color particle 38*a* appears in position opposite the dark color particle 38 of the array 25. It will be understood that the arrangement of the remaining color particles is changed in a similar manner, so that the strength of the predominating color represented by the particles between particles 37a and 36a will vary progressively, from the extremely light tint represented by color particle 37a to the pure color represented by the particle 36a. The same is true, of course, of the remaining color particles disposed between the vertices of the color triangles. For identification of each particle a new number may be written at the left of each particle, on the color array.

Figure 7:
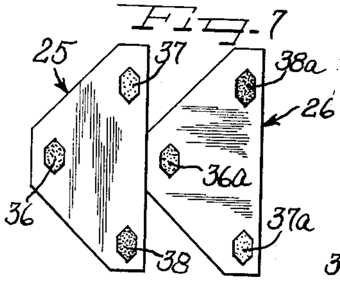

The position of the color arrays 25 and 26 located in Figure 7 is similar to that shown in Figure 4, except that the color array 26 has its particles positioned with the arrangement they assumed in the system of Figure 6. The result of the re-arrangement is the relocation of the dark shaded particle 38a in the upper right-hand vertex of the color triangle and the relocation of the light tint color particle 37a in the lower right-hand vertex of the triangle.

Figure 8:
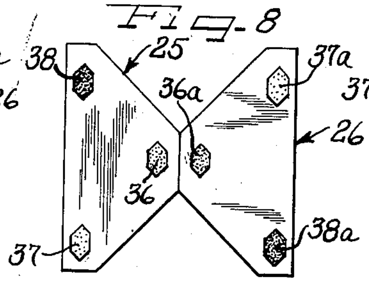

The fifth possible arrangement of the color arrays is illustrated in Figure 8. In this arrangement, the color arrays 25 and 26 are placed with their shortest edges in abutting contact. The color array 25 has been rotated through an angle of 180° without relocation of the color particles from their position in Figure 4, while the color array 26 maintains the same relative position and arrangement of color particles as illustrated in Figure 4.

Figure 9:
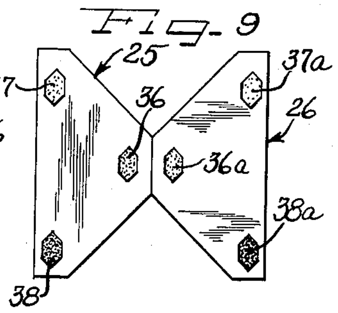

In the sixth basic arrangement of the color arrays, illustrated in Figure 9, the arrangement of Figure 8 has been modified by reorienting the color particles of the array 25 to form a mirror image of their positions in Figure 8. In this position the light-tinted particle 37 is in the upper left-hand vertex of the color triangle and the dark-shaded particle 38 is in the lower left-hand vertex of the color triangle.

In addition to the six basic positions illustrated in Figures 4 to 9, inclusive, the color arrays can also be arranged in six secondary positions. These positions are achieved by rotating some of the arrays through an angle of 180°, and inverting others, with relocation of the color particles on opposite sides of the array, to present still different orientations between the color particles of the two arrays. While some duplication of color patterns will result, this use of these secondary positions will be made for determining the maximum color combinations from my system.

Further, some additional combinations will be achieved by changing the respective positions of the two arrays illustrated in the drawings. Thus, the array 26 can replace the array 25, and vice versa, to select still other color combinations.

It will be noted that the locking board 16, due to the arrangement of its recessed portion and the extension E, is arranged to accommodate two color arrays 25 and 26 in any of the positions shown in Figures 4 to 9, or the secondary positions mentioned above. In Figure 2, the locking board is shown holding in locked position the color arrays 25 and 26 in the geometrical arrangement of Figure 8. In order to vary the alignment of the color arrays 25 and 26 and thus secure additional color combinations, the color array 26 can, for example, be turned through an angle of 180° and replaced in locked position within the locking board to yield the arrangement of color arrays shown in Figure 4. Because of the trapezoidal shape of the color arrays 25 and 26 and the shape of the recess 21 of the locking board, the color arrays 25 and 26 can be locked in this position.

The remaining component of the color harmony selection system of the present invention consists of a compound mask 70. This element is shown in Figure 10, in position over the assembly of Figure 2. The mask 70 is generally rectangular and includes opposed parallel side edges 71 and 72 and opposed parallel side edges 73 and 74. The mask is preferably white in color.

The mask 70 is provided with a plurality of apertures 75 to permit selected color particles on the underlying color arrays to be viewed in combination. The mask 70 also includes a plurality of shaped indexing apertures, such as a square 76, a generally diamond-shaped window or aperture 77, a circular aperture 78, a semicircular aperture 79, a triangular aperture 80, and a cut-out T at the top of the mask and identified by numeral 81. The purpose of the latter cut-out is to give the user an indication of whether one or the opposite surface of the mask is being used.

In operation, the mask 70 is placed over the locking board 16 containing the color arrays 25 and 26, as well as the neutral scale 52, if desired, and the mask is moved with respect to the locking board 16, always keeping the marginal edges of the mask 70 in parallel relationship with respect to the marginal edges of the locking board 16. Each time the mask is moved, a different color combination will be observed through the windows 75. For example, in the position of the mask 70 illustrated in Figure 10, the following color particles are exposed: particles 37a and 48a of array 26, and particles 38, 47 and 48 of array 25.

From any given position, the mask 70 may be moved in eight different directions in the selection of color scheme combinations, as long as the marginal edge 71 is maintained in parallel relationship with respect to the marginal edge of the locking board 16. These eight positions are obtained by moving the mask 70 directly upwardly, directly downwardly, diagonally upwardly to the right, diagonally upwardly to the left, directly to the left, directly to the right, diagonally lower to the right, and diagonally lower to the left. Movement of the mask 70 in the eight directions will thus provide a maximum of possible color combinations with the mask 70 in a given position with respect to the locking board 16.

For additional combinations, the mask 70 may be inverted and turned with respect to the locking board 16. For example, in Figure 10 the marginal edge 71 of the mask 70 is shown parallel to the marginal edge 18 of the locking board 16. Additional combinations may be derived by turning the mask 70 clockwise through an angle of 90° so that the marginal edge 71 is in parallel relationship with respect to the marginal edge 17 of the locking board 16. In this position, the mask can be manipulated in the same directions as previously explained, always keeping the marginal edge 71 of the mask 70 in parallel relationship with respect to the marginal edge of the locking board 16.

In a similar manner, the mask 70 can be rotated through 180° and 270° from the position shown in Figure 10 to obtain still different combinations. After having secured all the color combinations by rotating the mask 70 into the four different alignments with the locking board 16 previously explained; the mask 70 may be inverted and again realigned with the locking board 16 in four different relative positions, as previously explained. Because of the staggered arrangement of the windows 75 in the mask 70, each position of the mask with respect to the locking board 16 presents the possibility of securing color combinations not possible in the other posititions. Of course, some duplication results, but the total number of color combinations presented to the viewer, using the present system in the manner described, far exceeds other color harmony selection systems with which I am familiar. The mask of the present invention is a compound mask in that a window which is part of one color harmony pattern at a given time may join with other windows at another time and become part of an entirely different color harmony pattern.

Various modifications in the use of the color harmony selection system of the present invention will suggest themselves to the user. While only two color arrays are employed at any one time within the system, color harmonies having three and four predominating colors can be matched through the use of the device of the present invention. For example, after selection of suitable combinations from a two-component system in the manner previously described, one of the color arrays can be replaced with a third color array, and subsequently with a fourth color array.

In observing the various color harmony systems through the mask 70, the user may wish to vary the proportion of any given color appearing through a window 75. This may be accomplished by partially covering the color particle whose proportion in the final color scheme is to be diminished by means of placing a piece of white paper over a portion of the window directly above the given color particle. Cutting down the amount of the particular color visible in this manner gives the user a representative picture of color schemes with various proportions of the individual colors. One may wish to build a color harmony around an item of a set color. Here he may place each window of the mask successively over that color particle which matches or is closest to the color of the particular item. By using the mask in all eight positions of the color array, in six basic positions, he will be able to see many color patterns built around his basic one.

While the previous discussion has been made in connection with the use of a recessed locking board 16 for receiving the color arrays 25 and 26, the locking board may be eliminated, if desired, and the color arrays may be locked in position on an ordinary piece of white cardboard through the medium of thumb tacks inserted through the apertures 33 of the arrays.

From the foregoing, it will be appreciated that the color harmony selection system of the present invention provides many unique advantages over similar color systems previously suggested. Because of the geometry of the color arrays and the mask, a tremendous number of color harmonies may be observed for any given system. The system of the present invention is also characterized by ease of manipulation and can be readily employed by one unskilled in color theory.

It will be understood that modifications and variations may be effected without departing from the scope of the novel concepts of the present invention.

I claim as my invention:

1. A color harmony selection system comprising a mounting board, a pair of color selecting media held in fixed position on said mounting board, each of said color selecting media consisting of a polygonal-shaped member having a plurality of colored members detachably secured thereto, said members being arranged in the form of a triangle with a colored member containing a selected pure color at one vertex of the triangle, a colored member containing a light tint of the same color at another vertex, and a colored member representing a dark shade of the same color at the third vertex of the triangle, and colored members disposed between the vertices, the colored members disposed between the vertices varying progressively in shades of the selected color between any two of the vertices.

2. A color harmony selection system comprising a mounting board, a pair of color arrays held in fixed position on said mounting board, each of said color arrays consisting of a polygonal-shaped member having a plurality of individual color indicia of varying shades of the same color affixed thereto, said polygonal-shaped members having abutting edges when disposed in fixed position on said mounting board, and a neutral scale in fixed position on said mounting board overlying the abutting edges of said polygonal-shaped members, said neutral scale having individual aligned indicia thereon varying progressively in color from white through shades of grey to black.

3. A color harmony selection system comprising a mounting board, a pair of color arrays held in fixed position on said mounting board, each of said color arrays consisting of a generally trapezoidal-shaped member having a plurality of individual color indicia of varying shades of the same color affixed thereto, said trapezoidal-shaped member having abutting edges when disposed in fixed position on said mounting board, and a neutral scale in fixed position on said mounting board overlying the abutting edges of said trapezoidal-shaped members, said neutral scale having individual color indicia varying progressively from white through shades of grey to black.

4. A color harmony selection system comprising a mounting board, a pair of color arrays held in fixed position on said mounting board, each of said color arrays consisting of a generally trapezoidal-shaped member having a plurality of individual color indicia of varying shades of the same color affixed thereto, said trapezoidal-shaped member having abutting edges when disposed in fixed position on said mounting board, and a neutral scale in fixed position on said mounting board overlying the abutting edges of said trapezoidal-shaped members, said neutral scale having individual aligned indicia detachably affixed thereto, said indicia varying in color from white through shades of grey to black.

5. A color harmony selection system comprising a recessed mounting board, a pair of color arrays held in fixed position within the recess of said board, each of said color arrays consisting of a polygonal-shaped member having a plurality of color indicia varying in shades of the same color detachably affixed thereto in aligned rows, said polygonal-shaped members having abutting edges when disposed in fixed position on said mounting board, and a neutral scale in fixed position on said mounting board overlying the abutting edges of said polygonal-shaped members, said neutral scale having individual aligned indicia thereon varying progressively from white through shades of grey to black.

6. A color harmony selection system comprising a recessed mounting board, a pair of color arrays held in fixed position within the recess of said board, each of said color arrays consisting of a trapezoidal-shaped member having a plurality of individual color indicia varying in shades of the same color detachably affixed thereto in aligned rows, said trapezoidal-shaped members having abutting edges when disposed in fixed position in the recess of said mounting board, and a neutral scale in fixed position on said mounting board, overlying the abutting edges of said trapezoidal-shaped members, said neutral scale having individual aligned indicia thereon varying progressively from white through shades of grey to black.

7. In a color harmony selection system, a color array comprising a polygonal-shaped member having a plurality of colored members detachably secured thereto, said members being arranged in the form of a triangle with a colored member containing a selected pure color at one vertex of the triangle, a colored member containing a light tint of the same color at another vertex, and a colored member representing a dark shade of the same color at the third vertex of the triangle, and colored members disposed between the vertices, the colored members disposed between the vertices varying progressively in shades of the selected color between any two of the vertices.

8. In a color harmony selection system, a color array comprising a trapezoidal-shaped member, a plurality of colored members detachably secured to said trapezoidal-shaped member, said colored members being arranged to form a triangle with a colored member consisting of a pure color disposed at the vertex of the triangle closest to the shortest edge of said trapezoidal-shaped member, a colored member containing a light tint of the same color at another vertex of the triangle, a colored member containing a dark shade of the selected color at the third vertex of the triangle, and colored members disposed between the vertices varying progressively in shades of the selected color between any two of the vertices.

9. A color array display device comprising a substantially trapezoidal member formed of relatively stiff material, said member having a plurality of horizontally aligned openings formed therein and arranged in vertical staggered relationship with each pair of vertically adjacent openings in aligned relation, and a plurality of individual color indicia bearing elements substantially rectangular in configuration, each of said elements having a pair of diagonally positioned corners disposed within a pair of said vertically aligned openings, whereby said elements are detachably secured to said member.

EDITH JEAN BLANC MILLER.

References Cited in the file of this patent

UNITED STATES PATENTS

| Number | Name | Date |
|---|---|---|
| 572,216 | Patton | Dec. 1, 1896 |
| 1,125,423 | Wiley | Jan. 19, 1915 |
| 1,515,512 | Mitchell | Nov. 11, 1924 |
| 1,593,113 | Winoche | July 20, 1926 |
| 2,443,463 | Madden | June 15, 1948 |